United States Patent
Bone et al.

(10) Patent No.: US 6,618,202 B2
(45) Date of Patent: Sep. 9, 2003

(54) PROJECTION SYSTEM WITH AN OFFSET LENS ARRAY TO REDUCE VERTICAL BANDING

(75) Inventors: Matthew F. Bone, Fremont, CA (US); Isabella T. Lewis, San Jose, CA (US)

(73) Assignee: Aurora Systems, Inc., San Jose, CA (US)

( * ) Notice: Subject to any disclaimer, the term of this patent is extended or adjusted under 35 U.S.C. 154(b) by 0 days.

(21) Appl. No.: 09/870,431

(22) Filed: May 29, 2001

(65) Prior Publication Data

US 2002/0181114 A1 Dec. 5, 2002

(51) Int. Cl.[7] .............................................. G02B 27/10
(52) U.S. Cl. ...................... 359/621; 359/622; 359/626
(58) Field of Search ................................ 359/619, 621, 359/626, 628, 622, 623, 624; 348/336, 337

(56) References Cited

U.S. PATENT DOCUMENTS

| | | | | |
|---|---|---|---|---|
| 4,807,978 A | * | 2/1989 | Grinberg et al. | 345/32 |
| 5,680,231 A | * | 10/1997 | Grinberg et al. | 349/105 |
| RE36,393 E | * | 11/1999 | Glaser-Ibarni | 369/44.23 |
| 6,092,901 A | * | 7/2000 | Hashizume et al. | 362/19 |
| 6,101,040 A | * | 8/2000 | Itoh | 359/622 |
| 6,204,972 B1 | * | 3/2001 | Itoh | 359/622 |

* cited by examiner

*Primary Examiner*—Ricky Mack
(74) *Attorney, Agent, or Firm*—Henneman & Saunders; Larry E. Henneman, Jr.

(57) ABSTRACT

The mechanism of and a solution to the problem of vertical banding in projection systems is disclosed. An offset lens array includes a plurality of lens elements arranged in a plurality of rows that are offset with respect to one another. The offset lens array is incorporated in an illuminator for a projection system. The asymmetrical arrangement of the rows of lens elements in the array with respect to a seam in a color separation element of the projection system substantially reduces the vertical banding in the projected image.

17 Claims, 5 Drawing Sheets

PROJECTION SYSTEM WITH AN OFFSET LENS ARRAY TO REDUCE VERTICAL BANDING

BACKGROUND OF THE INVENTION

1. Field of the Invention

This invention relates generally to projection systems, and more particularly to a projection system having an illumination source with an offset lens array to eliminate vertical banding in the projected image.

2. Description of the Background Art

Multi-color projection systems typically employ an illumination source to generate a multi-colored illumination beam, and some means (e.g., dichroic plates) to separate the multi-colored illumination beam into a plurality of colored beams. Each of the colored beams is individually modulated with an imager (e.g., liquid crystal display, deformable mirror device, etc.) to infuse the colored beam with an image. The modulated colored beams are passed through some type of analyzer to resolve the image, and then recombined to form a multicolored imaging beam. The multi-colored imaging beam is then projected onto a display screen with a projection lens.

The quality of the images generated by such projection systems depends, in part, on having uniform brightness over the entire projected image. However, vertical bands of varying brightness have been observed in some multi-color projection systems where crossed dichroic plates are used for color separation and/or recombination.

But for the problem of vertical banding, crossed dichroic plates are desirable for use in multi-color systems for reasons of cost and efficiency. What is needed, therefore, is a system and method for eliminating vertical banding in multi-colored projection systems that include crossed dichroic plates.

SUMMARY

The present invention overcomes the problems associated with the prior art by providing an offset lens array that reduces banding in optical imaging systems. The invention facilitates the use of optical elements having seams therein (e.g., crossed dichroic plates, color cubes, etc.). The mechanism of and a solution to the problem of banding in projection systems is disclosed.

The offset lens array includes a plurality of lens elements arranged in a plurality of rows, at least two of the rows being horizontally offset with respect to one another. In a particular embodiment, adjacent rows of lens elements are horizontally offset with respect to one another. In a more particular embodiment, each row of lens elements is horizontally offset with respect to every other row in the array. In an even more particular embodiment, starting with a top row of the array, each successive row of lens elements is horizontally offset with respect to the preceding row of lens elements by the same distance. Particularly good results are obtained when the offset distance between successive rows is selected to be equal to one-half the width of one lens element divided by the number of rows in the array.

The offset lens array of the present invention is incorporated in an illumination source of a projection system. The illumination source includes a light source, a parabolic reflector, a first offset lens array, a second offset lens array, and a polarization conversion element. The first lens array has a corresponding arrangement with respect to the second lens array, such that each lens element of the first lens array focuses the image of the light source through an associated element of the second lens array. The polarization conversion element separates the s-state polarization component from the p-state component, and rotates the p-state component to match the emergent, reflected s-state. In a particular embodiment, the offset of the rows in the first and second lens arrays form nonvertical (i.e., not perpendicular to the rows) columns of lens elements. The polarization conversion element is rotated to align the polarization channels in the conversion element with the nonvertical rows of lens elements in the lens array.

The illumination source is incorporated in a multi-color projection system that also includes a color separating element. The color separating element (e.g., crossed dichroic plates) has a seam formed therein, that in prior art systems results in intensity banding. However, because the rows of lens elements of the offset lens arrays of the present invention are arranged asymmetrically with respect to the seam in the color separating element, banding is substantially reduced. The inventors have observed a significant reduction in vertical banding when the offset lens arrays are used in an off-axis, reflective LCD projection system.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing an offset lens array for an illumination source, that significantly reduces vertical banding in a projected image. In the following description, numerous specific details are set forth (e.g., the number of lens elements in an offset array, particular type of color separator, etc.) in order to provide a thorough understanding of the invention. Those skilled in the art will recognize, however, that the invention may be practiced apart from these specific details. In other instances, details of well known optical practices (e.g., mounting, focusing, optimization, etc.) and components (lenses, imagers, polarizers, etc.) have been omitted, so as not to unnecessarily obscure the present invention.

Figure 1:
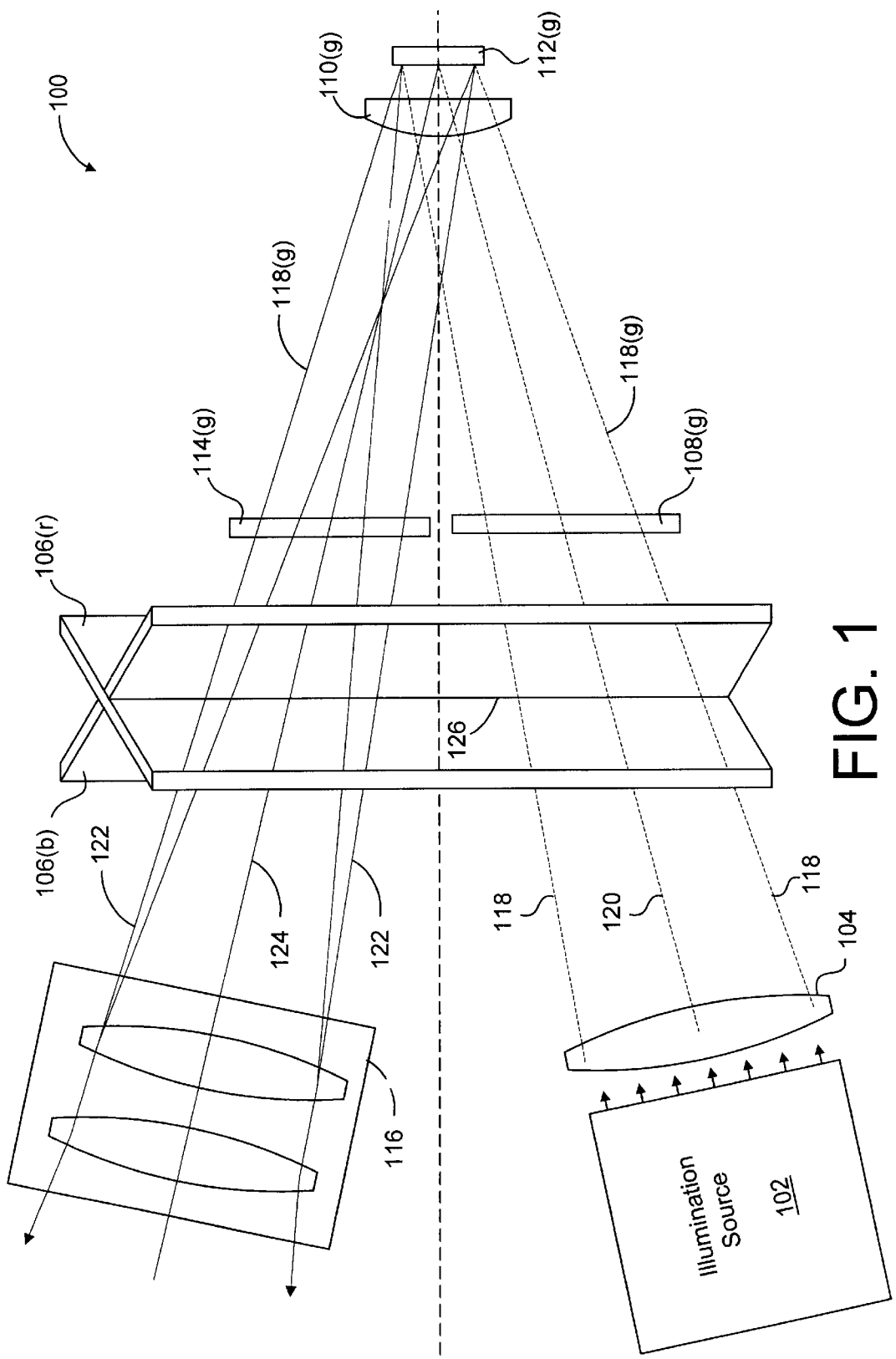
FIG. 1 is a side perspective view of one channel of a multi-channel projection system.

FIG. 1 shows one channel of a multi-channel off-axis projection system 100, including an illumination source 102, a condenser lens 104, a pair of crossed, dichroic plates 106 (r and b), a polarizer 108(g), a field lens 110(g), a reflective LCD 112(g), an analyzer 114(g), and a projection lens group 116. Illumination source 102 generates an illumination beam 118, and directs illumination beam 118, along an axis 120, through polarizer 108(g) and field lens 110(g) to impinge on LCD 112(g). Polarizer 108(g) linearly polarizes illumination beam 118(g) into a first polarized state, corresponding to the transmission axis of polarizer 108(g). LCD 112(g) is controlled by a system, e.g., a computer or video signal source, (not shown), and modulates the polarity of selected portions (i.e., pixels) of illumination beam 118(g) to form an imaging beam 122, which is reflected along an axis 124, through analyzer 114(g), through dichroic plates 106(r, b) and into projection lens group 116. Projection lens group focuses imaging beam 122 onto a display surface (not shown).

Analyzer 114(g) is also a linear polarizer. Projection system 100 can operate in at least two different modes. For example, if the transmission axis of analyzer 114(g) is oriented parallel to the transmission axis of polarizer 108(g), then analyzer 114(g) will pass unmodulated portions and block modulated portions of imaging beam 122(g). On the other hand, if the transmission axis of analyzer 114(g) is oriented orthogonally with respect to the transmission axis of polarizer 108(g), then analyzer 114(g) will pass modulated portions and block unmodulated portions of imaging beam 122(g). In one embodiment, polarizer 108(g) and analyzer 114(g) are both fashioned from HN42HE polarizing material available from Polaroid Corporation.

Crossed, dichroic plates 106(r) and 106(b) are disposed in illumination beam 118 and imaging beam 122, to separate illumination beam 118 into red 118(r) (FIG. 2), blue 118(b) (FIG. 2), and green 118(g) colored illumination beams, and to direct each colored illumination beam 118(r, b, and g) to a respective one of three LCDs 112(r) (FIG. 2), 112(b) (FIG. 2), and 112(g). LCDs 112(r, b, and g) modulate the colored illumination beams 118(r, b, and g) to form colored imaging beams 122(r, b, and g), respectively, and reflect the colored imaging beams 122(r, b, and g) back toward dichroic plates 106(r and b) which recombine the colored imaging beams 122(r, b, and g) to form imaging beam 122.

The angular separation between illumination beam 118 and imaging beam 122, in conjunction with the color separation by dichroic plates 106(r and b), allows separate polarizers 108(r, b, and g) and separate analyzers 114(r, b, and g) to be used for each color channel, advantageously decoupling the polarization and color separation processes.

Dichroic plates 106(r) and 106(b) are both approximately 3 mm thick, and form angles of 45° and 135°, respectively, with respect to both illumination beam 118 and imaging beam 122. Dichroic plate 106(r) is actually two separate plates fixed to dichroic plate 106(b) along seam 126. Applicants have determined that the symmetrical relationship between seam 126 and conventional lens arrays used in illumination sources is the cause of the vertical banding observed in prior art projection systems. Accordingly, illumination source 102 includes an inventive offset lens array that disrupts this symmetrical relationship, and thereby significantly reduces vertical banding in the projected image.

Figure 2:
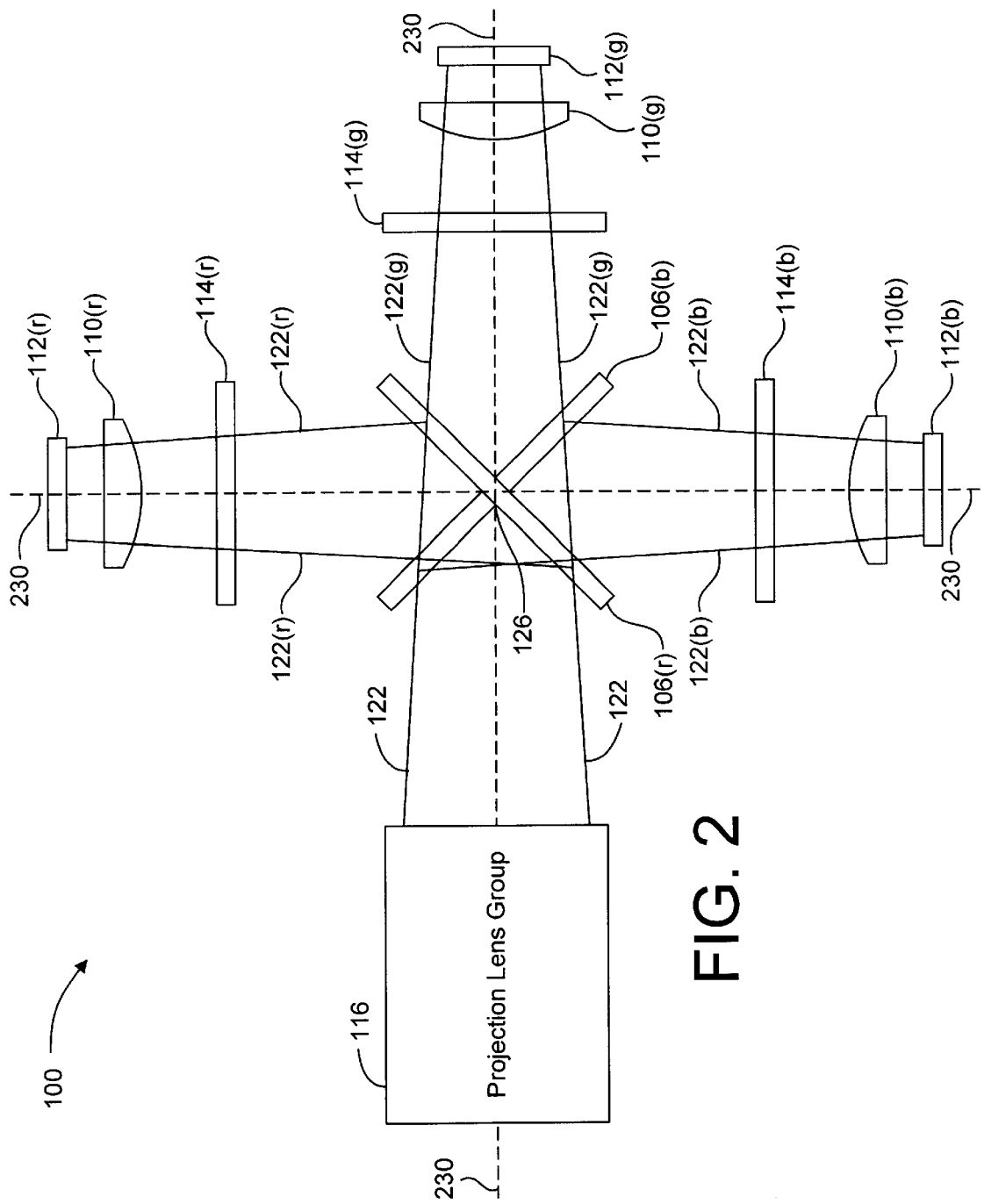
FIG. 2 is a top view of the projection system of FIG. 1, showing all three channels.

FIG. 2 shows a top view of projection system 100, including the remaining color channels of the system. System axis 230 lies in the plane of the page, while imaging beam 122 extends up out of the plane of the page, and obscures the view of illumination beam 118, which rises from illumination source 102 located beneath the plane of the page. Projection lens group 166 is disposed above the plane of the page, and obscures the view of illumination source 102. Similarly, analyzers 114(r, b and g) obscure the view of polarizers 108(r, b, and g), respectively.

Figure 3:
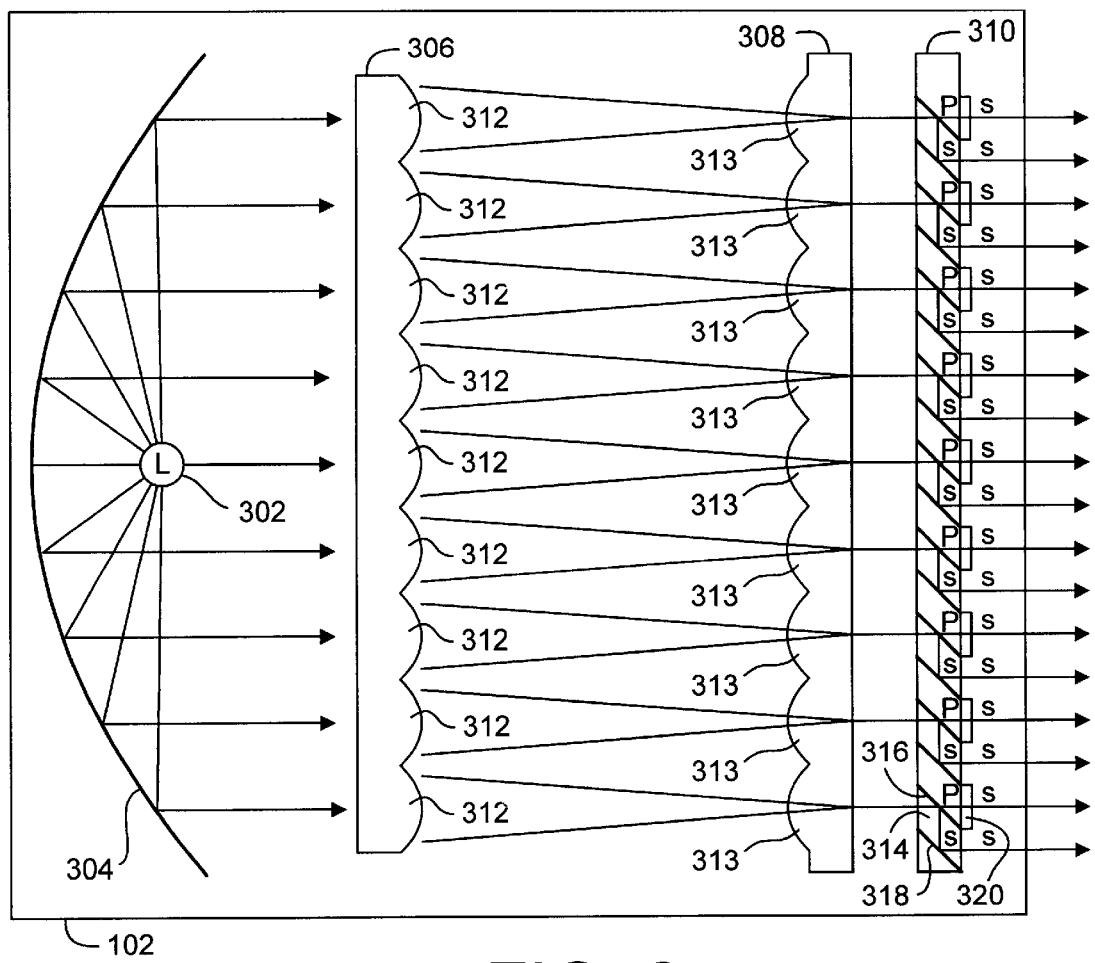
FIG. 3 is a diagrammatic cross-sectional view of the illumination source of FIG. 1.

FIG. 3 is a diagrammatic cross-sectional view of illumination source 102. Illumination source 102 includes a light source 302 (e.g., and arc lamp), a parabolic reflector 304, a first offset lens array 306, a second offset lens array 308, and a polarization conversion element 310. Offset lens array 306 includes a plurality of lens elements 312, and offset lens array 308 includes a plurality of lens elements 313, both arranged in a plurality of rows (see FIG. 7). The cross-sectional view of FIG. 3 is taken through one of the rows of lens elements 312 and 313.

Light source 302 is disposed near the focus of parabolic reflector 304, such that light source 302 is imaged into each lens element 312 of offset lens array 306. Offset lens array 308 is disposed parallel to and a spaced distance from lens array 306. Further, lens elements 312 of lens arrays 306 and lens elements 313 of lens array 308 are arranged similarly, except that the convex portions of lens elements 312 and 313 face one another, such that each lens element 312 focuses an image of light source 302 into a corresponding lens element 313.

Polarization conversion element 310 is disposed adjacent lens array 308, and polarizes the randomly polarized light passing therethrough. Polarization element 310 includes a plurality of polarizing channels 314 extending through polarization conversion element 310, such that each polarizing channel 314 polarizes light received from one lens element 313 of each row of lens elements in lens array 308. Each polarizing channel includes a polarizing beam splitting surface 316, a reflecting surface 318, and a retarder 320. Polarizing beam splitting surface 316 reflects s-polarized light and transmits p-polarized light. Reflecting surface 318 reflects the s-polarized light out through retarder 320 along the same direction as the transmitted p-polarized light. Retarder 320 rotates the polarization of the transmitted p-polarized light from the p-state to the s-state, such that all light emitted from polarization conversion element 310 is polarized in the s-state.

Those skilled in the art understand that lens elements of lens arrays are designed such that each lens element illuminates the entire display. In other words, the output of illumination source 102 appears to system 100 as an array of point light sources. Further, because each polarizing channel 314 of polarization conversion element 310 splits each beam of light, there will appear to be two point sources for each lens element 313 in lens array 308.

Figure 4:
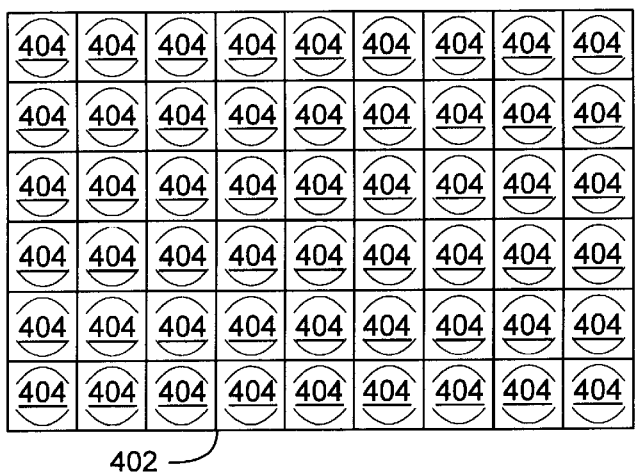
FIG. 4 is a front plan view of a conventional lens array.

FIG. 4 is a front plan view of a conventional lens array 402 including a plurality of lens elements 404. Unlike offset lens arrays 306 and 308, lens elements 404 of array 402 are arranged in a regular rectangular array of columns and rows. As indicated above, the inventors have determined that the symmetrical relationship between lens arrays such as array 402 and seams (e.g., seam 126) in the field of view of projection system 100 causes banding in prior art projection systems.

The mechanism of this banding effect will be discussed with reference to FIGS. 5–6 and 8. These figures are not drawn to scale, and are not intended to convey precise quantitative information. Rather, these figures are presented to provide a qualitative explanation of the banding effect.

Figure 5:
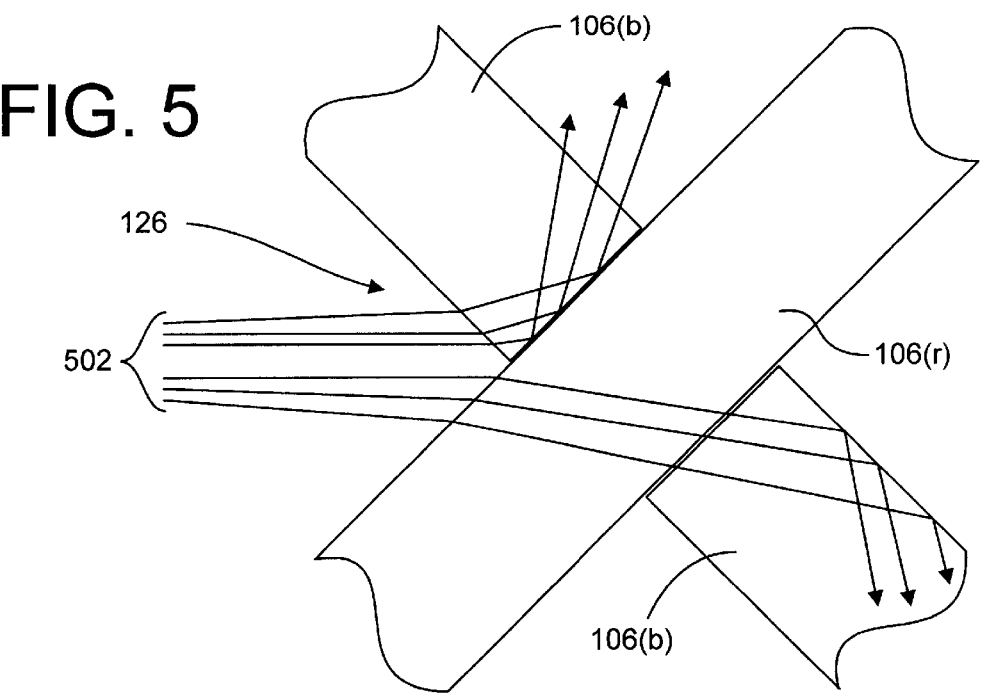
FIG. 5 is a top view of the intersection of the crossed dichroic plates of FIG. 1.

FIG. 5 is a top view of seam 126 between dichroic plate 106(r) and dichroic plates 106(b). Light rays 502 are green light rays that should pass through both dichroic plates 106(r and b), and illuminate imager 112(g). However, as a result of total internal reflection (TIR) caused by seam 126, the rays are not transmitted through plates 106(r and b), but rather are redirected. The redirected light may be trapped in plates 106(r and b) as a result of TIR, or may be directed into one of the other channels. As a result, seam 126 interferes with the uniform illumination of imagers 112 (r, g, b), either as a shadow or as additional reflected light.

Figure 6:
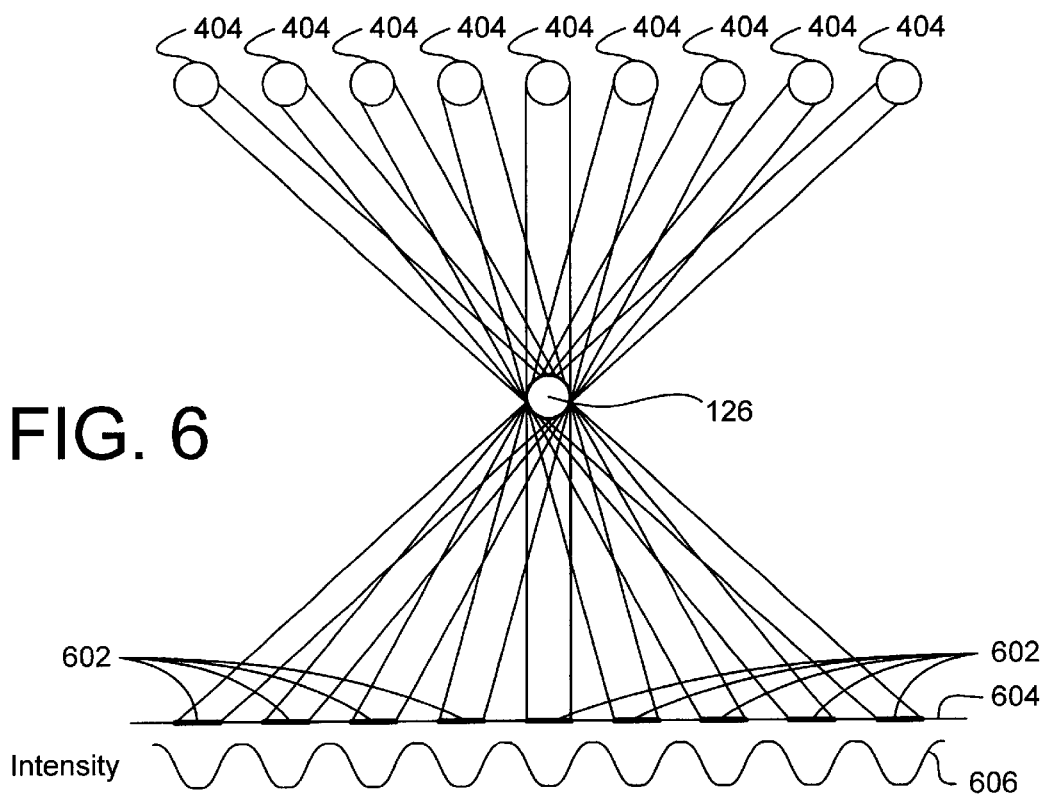
FIG. 6 is a diagram illustrating how the interaction of a conventional lens array and the seam between crossed dichroic plates results in vertical banding.

FIG. 6 is a diagram that illustrates how the regular arrangement of lens elements 404 and seam 126 produce vertical banding in a projected image. Lens elements 404 shown in FIG. 6 are the elements of a single row of lens array 402. Seam 126 casts a shadow on the surface 604 of an imager from each lens element 404. As a result, the areas of surface 604 that have a shadow 602 cast thereon, are illuminated by only eight of the nine lens elements 404, resulting in a faint banding effect. As indicated above, each lens element illuminates the entire imager surface. Therefore, the bands caused by seam 126 extend vertically through the entire display. Note however, that depending on the particular dimensions of a system, lens elements 404 located at the far edges of array 402 may not cast a shadow 602 on surface 604. Curve 606 shows the periodic nature of the illumination across the surface 604 in the horizontal direction.

Because each row of elements 404 in array 402 is aligned vertically, the shadows cast by seam 126 fall in the same positions on imager surface 604 for each row. As a result, the contrast between the light and dark areas is increased, and the banding becomes more pronounced.

Figure 7:
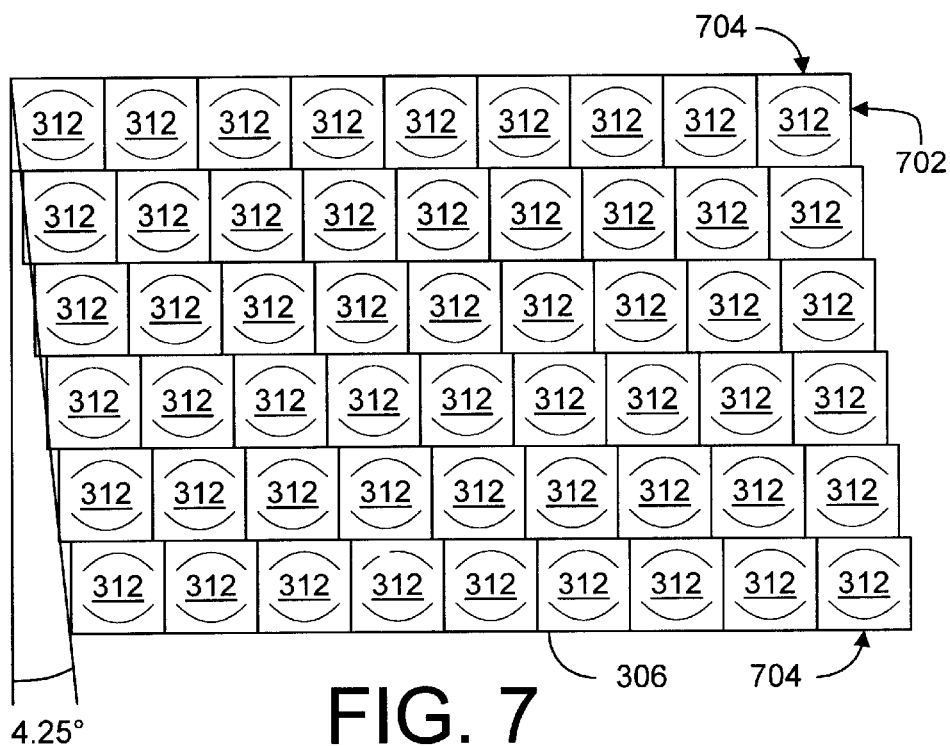
FIG. 7 is a front plan view of an offset lens array according to the present invention.

FIG. 7 is a front plan view of offset lens array 306 of illumination source 102. Offsetting at least some of the rows of elements horizontally with respect to one another displaces the banding caused by the offset rows, thereby homogenizing the banding over the entire display surface. In this way, banding caused by one row is compensated for by the banding of another row offset with respect to the first row. Arranging the lens elements 312 of lens array 306 asymmetrically with respect to the defect (i.e., seam 126) that is the source of the banding reduces the severity of any banding in the image.

In this particular embodiment of the invention, each row of the display is offset with respect to every other row of the display. Starting with the top row 702 of lens elements 312, each successive row is offset in the same direction, by the same amount. To spread the banding as evenly as possible over the image, the distance that each row is offset with respect to the preceding row is selected to be equal to one-half the width of one of lens elements 312 divided by the number of rows of lens elements 312 in lens array 306. The reason that rows are dispersed over one-half the width of lens element 312 is because that each lens element 312 has two point sources focused therethrough, as shown in FIG. 3.

Offsetting the rows of lens array 306 as described above results in diagonal columns of lens elements. As a result, polarization conversion element 310 (FIG. 3) is rotated by the offset angle (4.25° in this example embodiment), so that polarization channels 314 are aligned with the diagonal columns of lens elements 312 and 313 of lens arrays 306 and 308, respectively.

Figure 8:
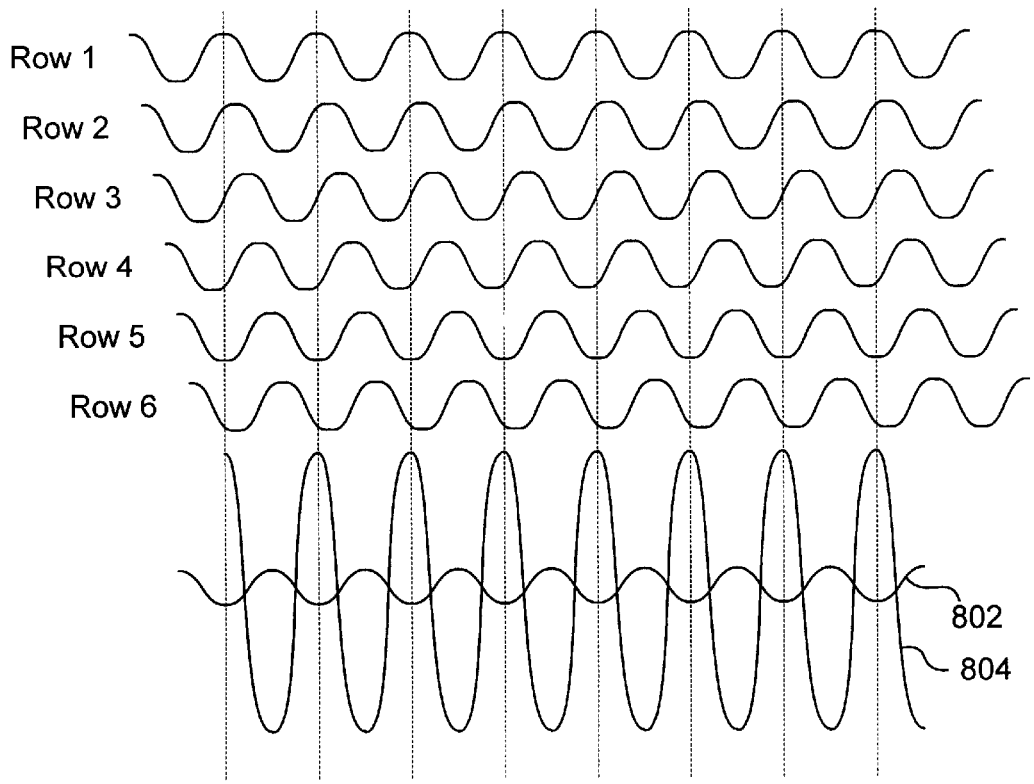
FIG. 8 is a diagram showing the light intensity levels across a display generated by each row of the offset lens array of FIG. 7, and the cumulative effect thereof compared to that of a conventional lens array.

FIG. 8 shows the periodic illumination intensity curves across a display for rows 1–6 of offset lens array 306. As a result of the horizontal offset of the rows of lens array 306, each of the curves has a corresponding phase shift. Curve 802 is the sum of the curves for rows 1–6, inclusive, as a result of the phase shift. Curve 804 is the sum of similar curves from a lens array wherein the rows are aligned rather than offset. Comparison of curves 802 and 804 illustrates the advantage provided by the present invention. In particular, curve 804 is indicative of pronounced vertical banding, whereas curve 802 shows only a slight variation in intensity across the display. The reader is again cautioned that all of the curves of FIG. 8 are presented to provide a qualitative understanding of the present invention, and do not represent any real experimental data.

The description of particular embodiments of the present invention is now complete. Many of the described features may be substituted, altered or omitted without departing from the scope of the invention. For example, while the embodiment disclosed herein focused on eliminating vertical banding caused by the seam of crossed dichroic plates, the offset lens array of the present invention will also reduce banding caused by imperfections in other optical elements (e.g., seams in color cubes). As another example, the disclosed embodiment focused on correcting vertical banding. However, should the seam causing the banding be disposed horizontally, such horizontal banding may be reduced by offsetting the columns of lens elements in a lens array vertically with respect to one another. Further, the present invention is usefull in systems with alternate display types (e.g., deformable mirror devices, pSi, etc.) These and other deviations from the particular embodiments shown will be apparent to those skilled in the art, particularly in view of the foregoing disclosure.

We claim:

1. An illumination system comprising:

a light source for emitting a beam of light;

a first lens array including a plurality of lens elements arranged in a plurality of rows, at least two of said rows of lens elements being horizontally offset with respect to one another;

a second lens array including a plurality of lens elements arranged as the elements of said first lens array, said second lens array disposed a spaced distance from said first lens array, such that each lens element of said first lens array focuses a portion of said beam of light through a corresponding lens element of said second lens array; and a polarization conversion element disposed adjacent said second lens array to polarize the portions of said light beam passing through said second lens array; and wherein starting with a top row of said first lens array, each successive row of said lens elements is horizontally offset with respect to the preceding row of said lens elements by the same distance, thereby forming nonvertical columns of lens elements in said first lens array;

starting with a top row of said second lens array, each successive row of said lens elements is horizontally offset with respect to the preceding row of said lens elements by the same distance, thereby forming nonvertical columns of lens elements in said second lens array; and said polarization conversion element is rotated about an axis passing through said first lens array, said second lens array, and said polarizing conversion element such that the polarizing channels of said polarization conversion elements align with said nonvertical columns of said lens elements.

2. An illumination system comprising:

a light source for emitting a beam of light;

a first lens array including a plurality of lens elements arranged in a plurality of rows, at least two of said rows of lens elements being horizontally offset with respect to one another; and a second lens array including a plurality of lens elements arranged as the elements of said first lens array, said second lens array disposed a spaced distance from said first lens array, such that each lens element of said first lens array focuses a portion of said beam of light through a corresponding lens element of said second lens array; and wherein adjacent rows of said lens elements of said first array are horizontally off set with respect to one another; and wherein adjacent rows of said lens elements of said second lens array are horizontally offset with respect to one another.

3. An illumination system according to claim 2, wherein:

each row of said lens elements of said first lens array is horizontally offset with respect to every other row in said first lens array;

each row of said lens elements of said second lens array is horizontally offset with respect to every other row in said second lens array.

4. An illumination system according to claim 3, wherein:

starting with a top row of said first lens array, each successive row of said lens elements is horizontally offset with respect to the preceding row of said lens elements by the same distance; and starting with a top row of said second array, each successive row of said lens elements is horizontally offset with respect to the preceding row of said lens elements by the same distance.

5. An illumination system according to claim 4, wherein said same distance is equal to one-half the width of one of said lens elements divided by the number of rows of said lens elements in one of said arrays.

6. A projection system comprising:

an illumination source for emitting an illumination beam, said illumination source including a lens array having a plurality of lens elements; and a color separating element for separating said illumination beam into a plurality of colored illumination beams, said color separating element having a seam therein; and wherein said lens array is arranged asymmetrically with respect to said seam.

7. A projection system according to claim 6, wherein:

said color separating element includes crossed dichroic plates; and said seam is the joint formed between said dichroic plates.

8. A projection system according to claim 7, wherein:

said lens elements are arranged in a plurality of rows; and at least two of said rows are offset with respect to one another in a direction perpendicular to said seam.

9. A projection system according to claim 7, further comprising a plurality of reflective displays, each disposed in a respective one of said colored illumination beams.

10. A projection system according to claim 9, wherein each of said reflective displays has a reflective surface, and is oriented such that said colored beams impinge on said reflective surfaces at a nonperpendicular angle.

11. A projection system according to claim 6, wherein:

said lens elements are arranged in a plurality of rows; and at least two of said rows are offset with respect to one another.

12. A projection system according to claim 11, wherein adjacent rows of said lens elements are offset with respect to one another.

13. A projection system according to claim 12, wherein each of said rows is offset with respect to every other row in said lens array.

14. A projection system according to claim 12, wherein starting with a top row of said lens array, each successive row of said lens elements is offset with respect to the preceding row of said lens elements by the same distance.

15. A projection system according to claim 14, further comprising:

a polarization conversion element having a plurality of polarizing channels; and wherein the offset of each successive row of said lens elements forms diagonal columns of lens elements in said lens array; and said polarization conversion element is rotated about an axis passing through said lens array and said polarizing conversion element such that the polarizing channels of said polarization conversion elements align with said diagonal columns of said lens elements.

16. A projection system according to claim 14, wherein said same distance is equal to one-half the width of one of said lens elements divided by the number of rows of said lens elements.

17. A projection system according to claim 6, further comprising a second lens array including a plurality of lens elements arranged as the elements of said first lens array, said second lens array disposed a spaced distance from said first lens array, such that each lens element of said first lens array focuses a portion of said illumination beam through a corresponding lens element of said second lens array.

* * * * *